J. F. VERVOORT.
AUTOMOBILE LOCK.
APPLICATION FILED OCT. 30, 1916.
1,236,124.
Patented Aug. 7, 1917.
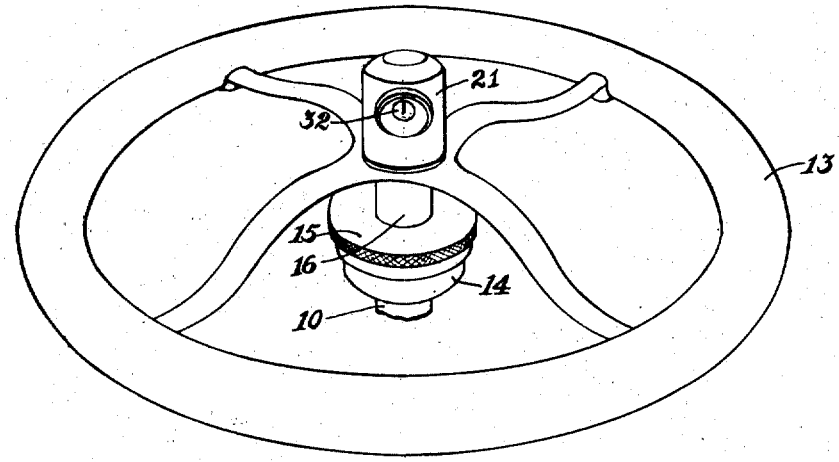
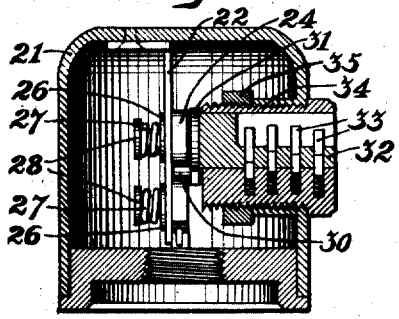
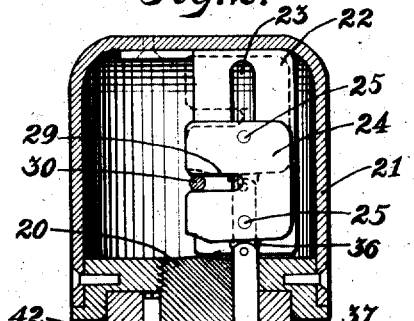
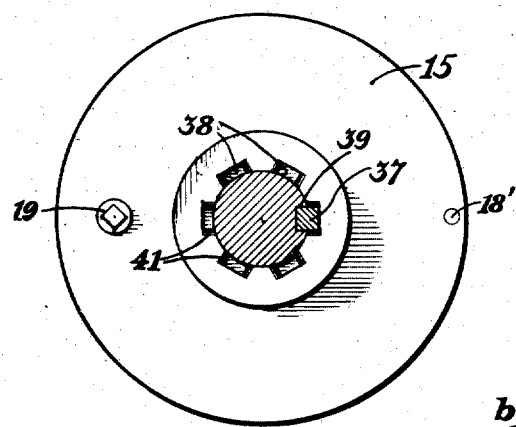
Inventor
Jules F. Vervoort
by Hazard Berry & Miller
att'ys.

UNITED STATES PATENT OFFICE.

JULES F. VERVOORT, OF LOS ANGELES, CALIFORNIA, ASSIGNOR OF ONE-FOURTH TO LEE D. McJILTON, OF LOS ANGELES, CALIFORNIA.

AUTOMOBILE-LOCK.

1,236,124.  Specification of Letters Patent.  Patented Aug. 7, 1917.

Application filed October 30, 1916. Serial No. 128,588.

*To all whom it may concern:*

Be it known that I, JULES F. VERVOORT, a citizen of the United States, residing at Los Angeles, in the county of Los Angeles and State of California, have invented new and useful Improvements in Automobile-Locks, of which the following is a specification.

My invention relates to an automobile lock, and particularly to a lock securing the steering shaft of an automobile against rotation.

The principal object of this invention is to provide an automobile lock which is applied to the steering wheel, and adapted to lock the same against rotation.

It is another object of this invention to construct an automobile lock which is inexpensive of manufacture, positive in operation, and which may be easily applied to any automobile in use without mutilation of the parts involved.

With the above and other objects in view which will appear as the description proceeds, my invention consists in the construction, combination and arrangement of parts hereinafter described and claimed.

In the accompanying drawings which form a part of this specification, I have illustrated a convenient and practical embodiment of my invention, and in which:

Figure 1 is a perspective view of the upper part of the steering column of an automobile showing the steering wheel thereon, on the hub of which the automobile lock is mounted.

Fig. 2 is a vertical cross section through the lock and steering wheel, and the upper part of the steering column, some parts being shown in elevation, for clearness of illustration.

Fig. 3 is a vertical cross section of the lock taken at right angles to the view shown in Fig. 2.

Fig. 4 is a sectional view taken on line 4—4 of Fig. 2.

10 designates the steering shaft of the automobile on which steer gear pinions 10' are mounted. The upper shaft section 11 of said shaft has at its lower end a drive pinion 12. The steering wheel 13 is rigidly secured to the shaft 11. 14 designates the gear casing on the upper part of which a casing cap 15 is screw threaded. The cap 15 is provided with a sleeve or collar 16 encircling shaft 11. In order to rigidly and fixedly attach the cap 15 to the casing 14, I drill a vertical bore 17 through the cap 15 and the upper end of the casing 14 and insert a screw bolt 18 with a countersunk head 18'. This head is preferably milled or filed down so as to be perfectly flush with the upper face of the cap 15, thus rendering the removal of the cap extremely difficult. 19 designates a screw plug provided on the cap 15 whereby the gears housed in the gear casing 14 may be supplied with a lubricant.

In the ordinary construction of the steering wheel, a nut is mounted on the threaded upper end 20 of the shaft 11. This nut is removed and a lock casing 21 provided at the bottom with a threaded aperture is screwed on the threaded end 20. Within the casing, a vertical bracket or plate 22 is securely mounted by any suitable means. A vertical guide slot 23 extends nearly throughout the whole length of the bracket 22. A locking head 24 is slidably mounted on the plate 22 and is provided with a pair of guide pins 25 passing through the guide slot 23 and provided at the opposite ends with washers 26 yieldingly pressed against the plate 22 by helical springs 27, whose outer ends abut against heads 28 on the guide pins 25. The lock head 24 is provided with a horizontal slot 29 for the reception of a crank pin 30 which is mounted on the crank plate 31 of the rotatable lock barrel 32 provided with tumblers 33. The lock is actuated by a suitable key (not shown). The locking barrel of the lock is screw threaded into a cylindrical sleeve 34 extending inwardly from the side of the wall of the casing. A lock nut 35 at the inner end of the barrel prevents removal of the lock barrel from the lock casing.

At the lower end of the lock head 24 is a lug 36 on which a vertical locking bolt 37 is pivoted. The upper end 13 of the steering shaft 11 is provided with a vertical slot 39, and the hub of the steering wheel 13 is likewise provided with a vertical slot 40 adjacent said first slot 39, the two slots forming a unitary slot in which locking bolt 37 is reciprocably mounted. The collar 16 of the cap 15 is provided with a plurality of vertical slots 38 which I have shown to be six in number, although it will be understood the number may be varied as desired.

The upper ends of said slots are slightly flaring as at 41 to facilitate the reception of the locking bolt 37.

From the foregoing description, the operation of the automobile lock will be easily understood. When the automobile is in operation, the locking head 24 occupies the upper or inoperative position. In this position, the lower end of the locking bolt 37 is above the upper end of the collar 16 and therefore does not interfere with the operation of the steering wheel in driving the automobile. When it is desired to lock the steering wheel against rotation, and thereby prevent theft of the car, the key is inserted in the lock, the lock is operated so that the crank pin 30 and the locking head 24 of the locking bolt 37 occupy the position shown in Fig. 2, the wheel having been rotated in position for one of the slots 38 of the collar to be in alinement with said bolt. The lower end of the locking bolt will enter the slot of the collar and rigidly lock the steering shaft and the wheel to the stationary collar 16 against relative movement, thereby preventing rotation of the steering wheel.

A key 42 is provided, locking the upper end 20 of the shaft 11 to the hub of the steering wheel. It should also be noted that when the locking head is in its upper or inoperative position as indicated by the dotted lines in Fig. 2, the crank pin 30 will occupy the same position indicated in full lines in Fig. 2, which will be just below the lower end of the locking head, thereby supporting the same in its upper inoperative position.

I claim:

1. The combination with the steering mechanism of an automobile comprising a steering wheel, a steering shaft rigidly connected thereto, a stationary shaft casing having a fixed collar mounted thereon, a lock casing mounted on the hub of said wheel, a lock therein, a longitudinally reciprocable locking bolt actuated by said lock, said shaft being provided with a longitudinal slot, said collar being provided with a plurality of longitudinal slots, equi-distantly and circularly arranged and adapted to coöperate with said first-named slot to receive said bolt when the lock is operated to move said bolt into locking position whereby said shaft is locked against rotation in relation to said collar.

2. The combination with the steering mechanism of an automobile comprising a steering wheel, a steering shaft rigidly connected thereto, a fixed shaft casing having a fixed collar mounted thereon, a lock mounted on the hub of said wheel, a longitudinally reciprocable locking bolt actuated by said lock, said shaft being provided with a longitudinal slot, said collar being provided with a plurality of longitudinal slots circularly arranged adapted to coöperate with said first-named slot to receive said bolt when the lock is operated to move said bolt into locking position, whereby said wheel is locked against rotation in relation to said collar.

In testimony whereof I have signed my name to this specification.

J. F. VERVOORT.